FIG. I

FLOW CHART FOR EXAMPLE 1

United States Patent Office 3,540,927
Patented Nov. 17, 1970

3,540,927
GRANULAR TOTAL SUGAR PRODUCTS
AND PROCESS FOR PRODUCING
Masahiro Niimi, Tetsu Furukawa, and Hitoshi Masada, Tokushima, Japan, assignors to Nippon Shiryo Kogyo Co., Ltd., Tokushima, Japan
Continuation-in-part of application Ser. No. 607,853, Jan. 6, 1967, which is a continuation of application Ser. No. 324,253, Nov. 18, 1963. This application Oct. 10, 1967, Ser. No. 674,168
Claims priority, application Japan, July 4, 1964, 39/37.902
Int. Cl. B01d 9/02; C13k 1/10
U.S. Cl. 127—30
10 Claims

ABSTRACT OF THE DISCLOSURE

Granular crystalline products are prepared from water solution of high D.E. starch hydrolyzates. The total sugar solution is subjected to partial crystallization to form a pumpable massecuite composed of microcrystals of the sugar dispersed in a water solution of the sugar. The massecuite is sprayed into a drying air stream to form atomized droplets, and part of the water is removed to form granular aggregates of the sugar microcrystals containing residual crystallizable sugar solution. The aggregates are aged and dried to form internally additional sugar crystals and to further reduce water content. The products, comprising generally spherical granules formed of aggregates of microcrystals of the sugar, are characterized by being free-flowing and non-hygroscopic, and by rapid dissolution in water. Additives, such as sweetening or flavoring agents, can be homogeneously incorporated by dispersion in the massecuite before spray drying.

REFERENCES

Figure 1:
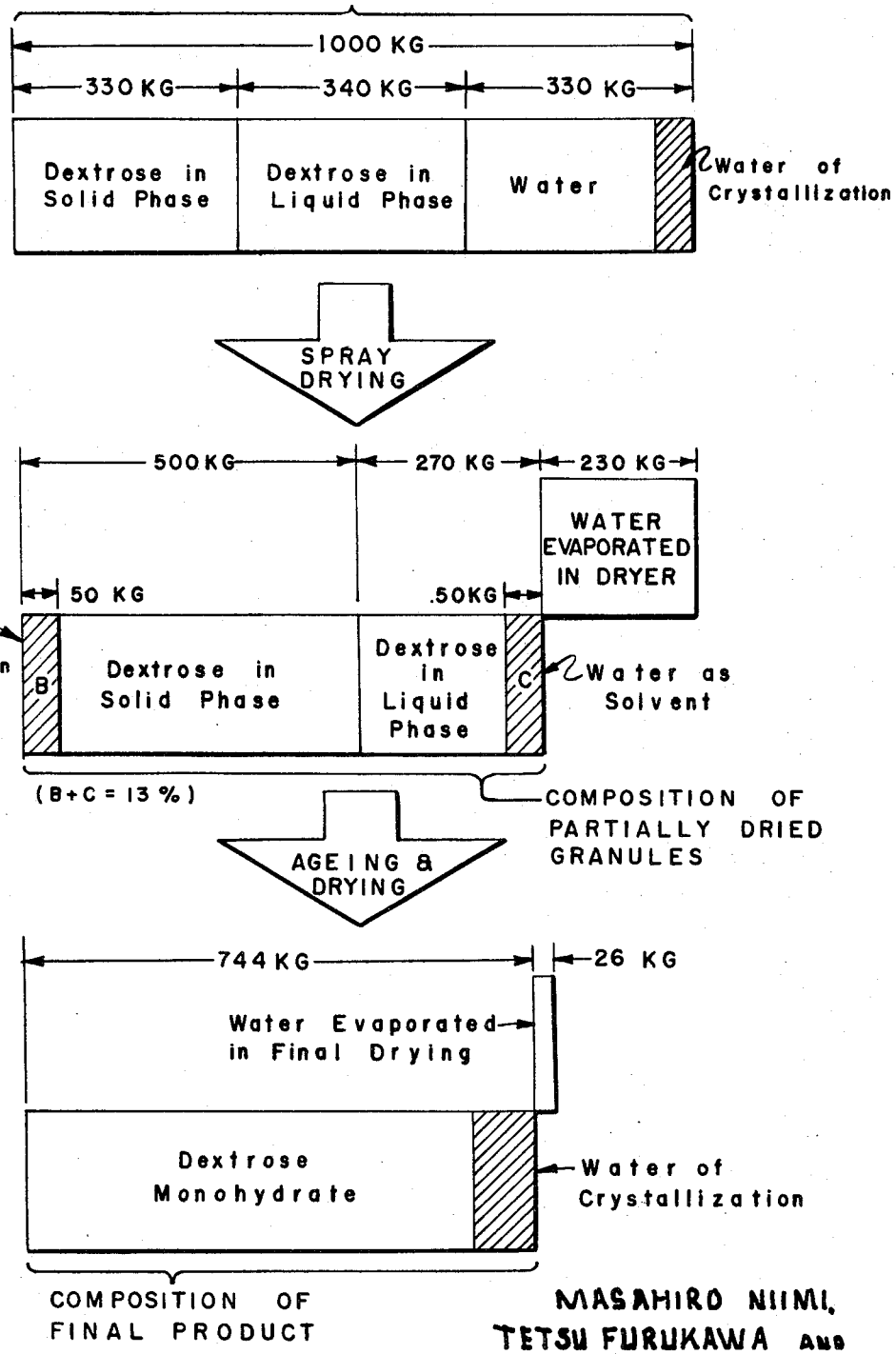

Part of the subject matter of this application is a continuation-in-part of our copending application Ser. No. 607,853, filed Jan. 6, 1967, which was a continuation of prior application Ser. No. 324,253, filed Nov. 18, 1963, now abandoned. Reference is also made to copending application Ser. No. 626,399 filed Mar. 28, 1967, and to application Ser. No. 550,123, filed May 16, 1966, now abandoned.

BACKGROUND

For many years it has been necessary to process water solutions of crystallizable sugar by standard crystallizing and separating operations to produce dry, free-flowing, relatively non-hygroscopic sugar products. Such crystallization processes are expensive and difficult to control, especially for processing starch hydrolyzates. The concentrated water solution of the sugar, such as high D.E. starch hydrolyzate or a cane sugar extract, is subjected to crystallization but it is difficult to remove more than about 70% of the crystallizable sugar in a single crystallizing and separating operation. Further processing of the supernatant saturated solution is required to recover more of the sugar as a crystalline product, and residual supernatant remains after each crystallization. Various sugar by-products are usually prepared from the residual supernatant. Mollasses is a common by-product from the crystallization of cane sugar, while the oligosaccharides remaining in the supernatant in the crystallization of dextrose can be condensed and dried for use in animal feeds. These by-products are of lesser value than the crystalline sugar.

Starch hydrolyzates of high dextrose content have been processed to produce a so-called "Total Sugar" product, which is a mixture of sugar crystals with uncrystallized solid solution of sugar and impurities. The process involves crystallization to form a massecuite of dextrose monohydrate crystals and residual solution. The massecuite or magma is then solidified in blocks, the blocks are sliced or pulverized, and the powder or granules are aged and dried to produce the final product. Since the pulverized Total Sugar product contains oligosaccharides in solid solution distributed over the exterior surfaces of the dextrose crystals, the product is hygroscopic and subject to agglomeration and caking. Various attempts have been made to improve the character of such Total Sugar products, but heretofore no one has successfully produced a granular crystalline Total Sugar product which is free-flowing and non-hygroscopic.

SUMMARY

In solving the problem of producing a free-flowing Total Sugar product from starch hydrolyzates, it was necessary to develop a radically new process for preparing a granular crystalline product from a water solution of a crystallizable sugar. This new process involves the novel step of "spray-crystallization," which is distinguished from ordinary spray drying. In the spray-crystallization step a sugar massecuite containing preformed sugar crystals is subjected to spray drying to form aggregates of sugar crystals. The complete process consists of a sequence of steps in which the conversion of the crystallizable sugar to crystalline form occurs in sequential stages, including crystallization stages both before and after the spray drying step. Because of the short time involved in the spray drying step itself, most of the crystallization can occur before and after the spray drying. The spray-crystallization essentially forms the aggregates from preformed microcrystals.

In the preferred process, a water solution of the crystallizable sugar is first subjected to partial crystallization to form a flowable or pumpable massecuite composed essentially of microcrystals of the sugar dispersed in a water solution of the sugar, which will usually be a substantially saturated solution. This massecuite is then subjected to spray drying. In the spray drying operation, atomized droplets of the massecuite are formed and part of the water is removed from the droplets while the droplets are air-borne, the water passing into the drying air stream, and the droplets being converted to soft granules, comprising aggregates of the sugar microcrystals while containing residual crystallizable sugar solution. The soft granules are then aged and dried to form additional sugar crystals therein and to further reduce their water content. The final product may be substantially dry, that is, it may contain little or no free water, but it may contain water of crystallization, such as when the microcrystals are in the form of dextrose monohydrate. Any remaining trace of free water is distributed within the granular aggregates, and therefore has little tendency to make the aggregates sticky or subject to caking.

The granular aggregates produced by this process are of a distinctive physical configuration. They are generally spherical and are formed of cohered sugar microcrystals, providing a hard, firm granular structure. As water evaporates from the sprayed droplets, the solution phase causes the droplets to assume psherical shapes due to the effect of liquid surface tension. With further contraction of the liquid phase during the spray drying, the residual solution is withdrawn within the aggregates, being distributed between and over the surfaces of the sugar crystals. After ageing and further drying, additional sugar crystals are formed within the interstices of the aggregates. In the final product, substantially all of the crystallizable sugar may be converted to crystalline form, leaving only the oligosaccharides in non-crystalline form. Since the oligosaccharides are distributed in thin films on the interior surfaces of the sugar crystals of the aggregates, there is little or no tendency for the non-crystalline oligosaccharides to cause the product to become hygroscopic. The exterior surfaces of the aggregates are formed substantially entirely of the microcrystals which have the desired property of being non-hygroscopic. The granular aggregates when observed through a microscope resemble minute golf balls, showing cracked patterns of crystals on their surfaces. These products have pronounced sweetness, are readily fermentable, and dissolve rapidly in water. In certain embodiments, the individual aggregates can be somewhat clustered.

Various additives and edible substances can be uniformly incorporated in the granular products by the simple procedure of mixing them with the massecuite before it is subjected to the spray drying operation. This procedure permits the ready incorporation of substances such as synthetic sweetening agents, edible organic acids, and food flavoring substances. Mixtures of additives can be incorporated, and mixtures of crystallizable sugar can be used to form the massecuite. In this latter connection there may be mentioned mixtures of dextrose and sucrose, dextrose and maltose, sucrose and maltose and the like mixtures.

DRAWINGS

Figure 2:
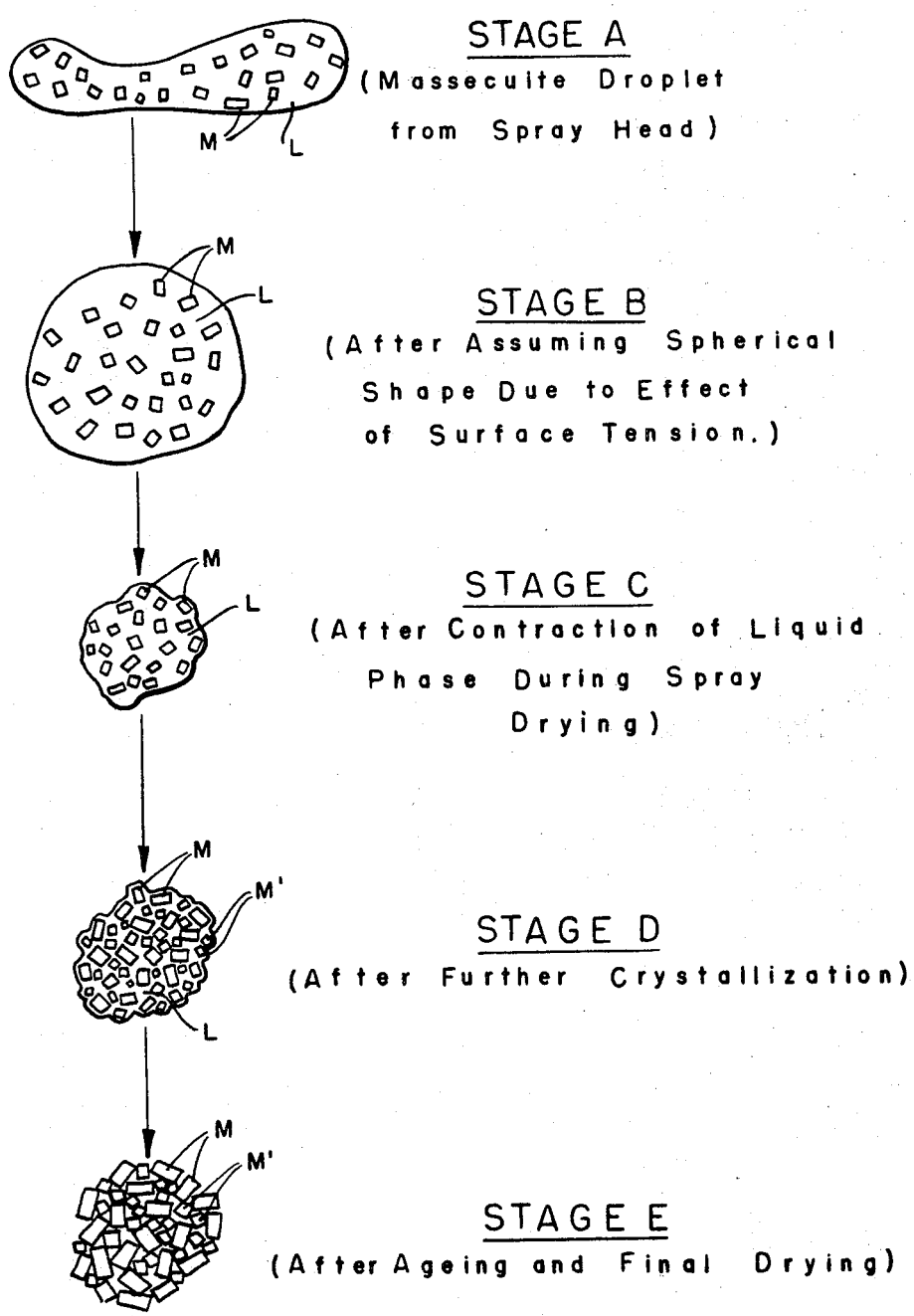
Figure 3:
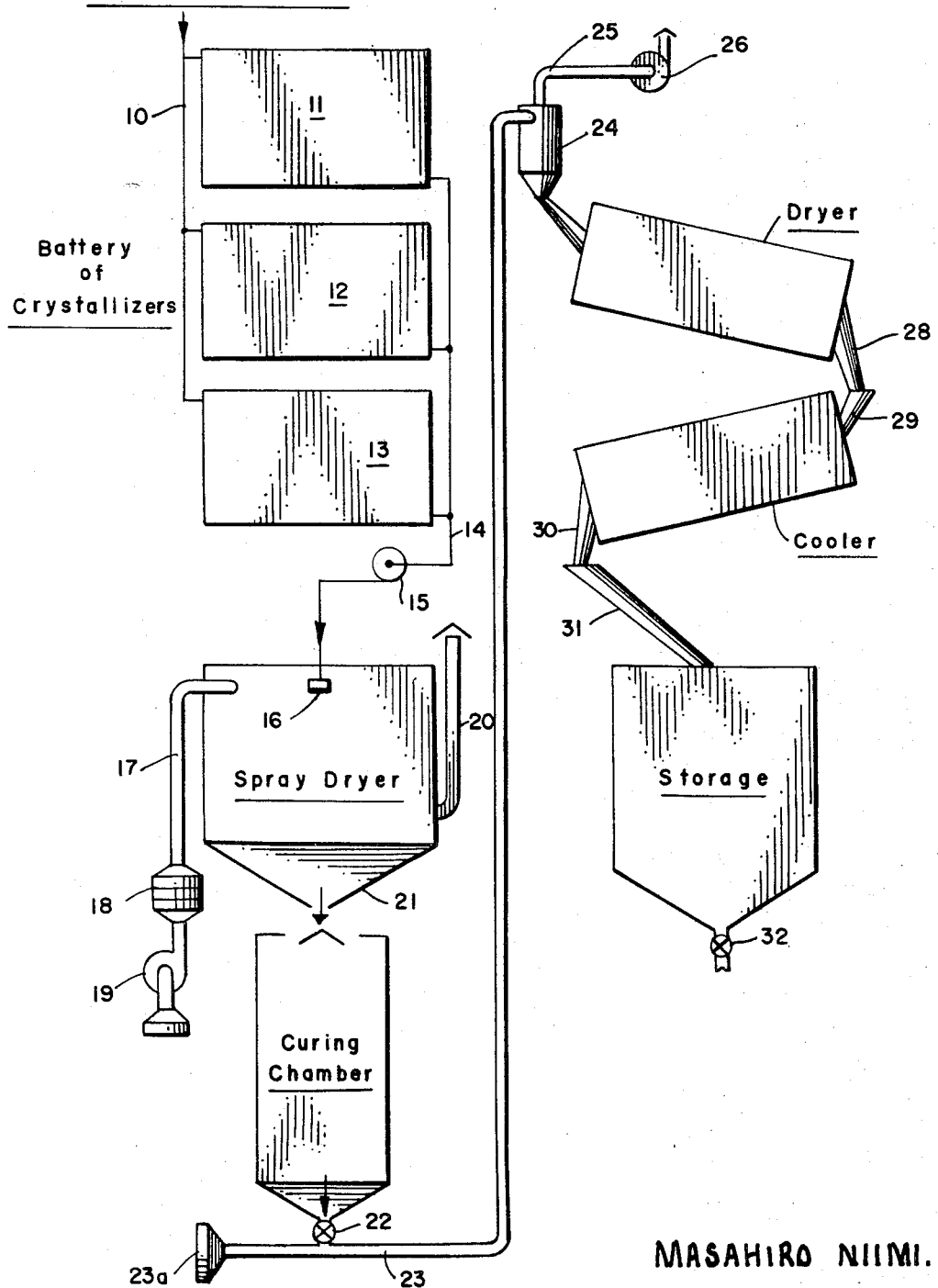

The disclosure of the application is supplemented by the drawings attached hereto, comprising FIG. 1, which is a flow chart illustrating the specific process embodiment of Example I;

FIG. 2, which is a greatly enlarged illustration of the principal stages in the formation of the granular products; and FIG. 3, which is a non-scale diagrammatic illustration of a plant layout for practicing the process and producing the products of this invention.

DESCRIPTION

In the United States, corn starch hydrolyzates have been processed commercially into crystalline dextrose in part because of the demand for a high quality uniform product. In the so-called Total Sugar system the exothermic heat of crystallization cannot be controlled uniformly and crystallization does not proceed satisfactorily or uniformly under extremely heterogeneous conditions. Furthermore, in this process the necessary mechanical treatment of the formed blocks is difficult. These disadvantages can be overcome with our invention and an excellent quality product can be economically produced with the Total Sugar system. The large surface area of the micro-crystalline dextrose particles facilitates the uniform diffusion of the exothermic heat of crystallization throughout the massecuite, and during the subsequent spray drying operation the suspended droplets or particles of dextrose almost instantaneously achieve a uniform temperature so that the evaporation of moisture from each particle as well as the subsequent crystallization is effected under substantially uniform conditions. Thus, a uniform crystalline product can be continuously produced without the production of hydrol and without the necessity for recycling dextrose powder.

The white dextrose monohydrate granules or aggregates thus obtained when observed through a microscope resemble a golf ball having cracked patterns of crystals on its surface, showing that the granules are aggregates of microcrystals. The product has a pronounced sweetness, is readily fermentable and is rapidly dissolved in water. Its chemical properties are identical with Total Sugar products of the same D.E. prepared by other methods and its hygroscopicity, viscosity, and oligosaccharide content may vary somewhat depending upon the degree and method of hydrolysis.

The massecuite used in this invention may be prepared from starch hydrolyzates brought to the desired high D.E. by an enzymatic treatment or by other methods.

In other words, this invention comprises: (1) preparation of massecuite the physical properties of which permit it to be pumped and sprayed, (2) spray drying of the said massecuite to a condition which will allow additional crystallization to take place between or on the surface of the microcrystals in the sprayed droplets or particles, and (3) ageing and further drying of the non-sticky crystal-containing powder from the spray dryer for several hours to permit additional crystallization to take place and to reduce it to a dry state by exposing the powder to a stream of air.

We have found that a snow-white crystal-containing, free-flowing, non-hygroscopic powder can be produced which has the same appearance, sweetness and fermentability as dextrose, and can be produced by means of a fully continuous system without the formation of hydrol by-products.

In carrying out the method of this invention a starch hydrolyzate liquor having a degree of conversion of at least about a 94 D.E. and preferably higher, is first produced and refined by an ordinary method, concentrated to about 70° Brix, for example, 67°, seeded, and allowed to crystallize to form a massecuite at from room temperature up to about 40° C. With slow stirring the rate of this pre-crystallization is comparatively high because of the low viscosity of the liquor, and an equilibrium point is reached after only 6 to 24 hours depending upon the D.E. of the solute. The stable massecuite formed is composed of approximately equal parts of (1) dextrose monohydrate crystals (calculated as anhydrous dextrose), (2) dextrose in solution, and (3) water. Its fluidity and stability permit it to be pumped through pipes without congealing due to further crystallization and without the solution of crystals due to the heat of friction during the pumping operation.

The low viscosity and the good heat diffusion properties of the massecuite or liquor permit the precrystallization to be carried out in a continuous system. The rate of crystal formation varies somewhat with the D.E. of the liquor and it is sometimes preferable to utilize several crystallizers so combined as to effect a maximum crystallization rate for formation of micro size crystals. The massecuite containing the microcrystals should be pumpable without having too great a setting or gel tendency. With a crystallizer having adequate agitation and heat transfer capacity, it is possible to control the precrystallization process so as to produce a crystal-size distribution which will subsequently permit the formation of spray droplets or particles of massecuite of the desired size and hence to control the specific volume of the final sprayed product. In addition, of course, the usual spray dryer variables are also utilized in producing an atomized spray of droplets of the desired size, e.g., adjustment of atomizer revolution rates, rate of charge of massecuite, etc.

The sprayed droplets or particles of massecuite contain large numbers of microcrystals which act as seed crystals and promote further crystallization. The extremely large surface area of these finely divided droplets causes their temperature to be substantially the same as the stream of air surrounding them and results in a rapid evaporation of water and a consequent additional crystal formation between or on the surfaces of the crystals already present in the supersaturated massecuite during deposition in the chamber. However, if two much water is evaporated and the rate of evaporation is too high, a glasslike solid can be obtained. It is therefore desirable to interrupt this evaporation and crystallization process in the spray dryer, leaving residual crystallizable sugar solution in the aggregates. For example, Total Sugar granules as recovered from the spray dryer can have approximately 13% moisture of which about 10% is water of crystallization. After ageing or curing for a short time at this moisture level to permit additional crystallization, the remaining free moisture can be progressively evaporated as the crystallization proceeds. The partially dry granules of sugar deposited on the bottom of the dryer can have a wet snow-like appearance. During the subsequent curing and drying, additional crystallization and moisture removal is effected so that in a few hours, snow-white dry granules are produced which have no lumping or adhesive tendencies. The length of the ageing period can vary depending on the D.E. of the massecuite, and is, for example, about three hours for a hydrolyzate having a D.E. of 97%. The curing and final drying operation can be carried out continuously by means of a conveyor system, by a rotary drying system, or by pneumatic handling. The final product, which may have about a 10% moisture content as water of crystallization, is composed substantially of dextrose monohydrate and has no adhesive or caking tendency. It can, therefore, be conveyed directly by means of a pneumatic apparatus to a hopper through which the product may be packed automatically without crushing.

While more rapid and efficient drying procedures than the above two step procedures are available, when dried too rapidly, the liquid or solution phase of the granules of microcrystal aggregates may not crystallize but rather tend to form a glass-like material (viz a solid solution) which is hygroscopic. Thus, to obtain the optimum product it is advantageous that the moisture content of the granules, be controlled and progressively maintained at a level which promotes additional crystallization. The necessary curing and drying can be accomplished in stepwise operations, or if desired may be simultaneously performed by a suitable continuous apparatus, for example, by a rotary type dryer, by a belt type conveyor, or by suitable pneumatic equipment. With any procedure there should be suitable control of the temperature, relative humidity, and flow velocity of the air, as is well known in the drying arts.

There are other benefits which can be realized and products which can be produced with the above system. Various additives may be mixed with the said Total Sugar aggregates, the additive being one which does not interfere with the crystallization of dextrose, for example, edible organic acids, synthetic sweetening agents, natural fruit juices, plant extracts or other food flavoring substances, either synthetic or natural, to obtain extremely homogeneous mixed crystals, which can not be obtained by conventional mechanical mixing systems. If desired, the process can be utilized for processing a solution of dextrose, which has been prepared by dissolving dextrose previously separated by centrifugation from hydrol, to produce instantly soluble materials consisting of dextrose homogeneously blended with the substances described above.

Example I

A starch hydrolyzate liquor having a D.E. of 97 prepared by any usual method is refined and evaporated in an ordinary manner to a Brix of 67°, and allowed to crystallize by agitating slowly in a crystallizer at 20° C. It is usually desirable to mix 0.5% of dextrose monohydrate crystals or substances containing dextrose monohydrate as the main component as the seed of crystallization. The time required for completion of the crystallization (the establishment of an equilibrium between the crystalline dextrose and the saturated solution at this temperature) is not fixed and varies depending on the grade or purity of the liquor, but is usually attained in about eight hours. The crystallization process may be either the usual batch type process or if desired may be a continuous procedure.

The massecuite thus obtained is composed of the developed crystals suspended in a saturated solution and is of such fluidity and stability that it may be readily pumped through pipes to the spraying apparatus. The massecuite containing the microcrystals is spray dried in small droplets which are allowed to drop through an air stream in the drying chamber. The temperature of the air is preferably controlled so as to be below 50° C. in order to obtain a product containing substantially dextrose monohydrate, which does not adversely affect the subsequent additional crystallization of the granules formed from the massecuite droplets or cause caking of the final product.

The spray drying chamber can consist of a vertical cylindrical upper section 7700 mm. in diameter and 7700 mm. high and a lower conical collection section 7700 mm. high. At the top center of the upper section is an atomizing device 350 mm. in diameter, rotated at 6500 r.p.m., to spray the massecuite at a rate of 1000 kg. per hour. A stream of drying air is admitted to the chamber at 55° C., but drops to about 45° C. due to the heat of evaporation of the water removed. The particles deposited on the bottom of the the spray dryer section contain 13% moisture on a dry basis, and as the result of evaporation of 230 kg. of free water per 100 kg. of charged massecuite there is obtained 770 kg. of partially dried material. This material which resembles damp snow is composed of about 65%–70% of crystalline dextrose monohydrate and about 35%–30% of a liquid dextrose solution. When aged for 3 to 5 hours and with slight additional drying, additional crystallization occurs in the solution portion and a free-flowing product results.

The foregoing process example is diagramaticaly summarized in FIG. 1, which is simplified to the extent that the small percent of oligosaccharide is not graphically represented.

Example II

A starch hydrolyzate liquor of 97 D.E. prepared by any suitable method is refined and concentrated by any usual procedure to a density of 67° Brix and is allowed to crystallize by the method described in Example I. During the massecuite preparation procedure a synthetic sweetening agent, for example, 1 to 1.5% sodium cyclohexyl sulfamic acid as a 10% solution is admixed. The additive dissolves homogeneously in the liquid phase of the massecuite and does not interfere with the dextrose crystallization process. The said massecuite is then pumped, sprayed, aged, and dried in the same manner as in Example I to produce a product having the same properties as that of Example I except that the sweetness is increased to approximately that of sucrose. Because of the uniform distribution of the additive effected by the process, the product is exceptionally homogeneous.

Example III

Massecuite prepared according to Example II is blended with an organic acid and processed as above to obtain a free-flowing granular product which contains the organic acid homogeneously distributed between or on the dextrose monohydrate crystals in each granule. Organic acids such as, for example, citric acid, succinic acid, or tartaric acid can be used in this process.

Example IV

A starch hydrolyzate liquor of D.E. 96 prepared by a suitable method is refined and concentrated in the usual manner and crystallized into massecuite according to Example I. Various food components, for example, concentrated fruit juice, vegetable juice, coffee extract, or cacao powder, etc., are then admixed homogeneously into the massecuite. Spray drying and subsequent elimination of the residual moisture using the subject process produces a final product which is either instantly soluble or easily dispersible due to the homogeneous distribution of these components in the individual granules. With some of these additives, it may be desirable to vary the moisture content somewhat to cause the massecuite fluidity to be suitable for pumping and spraying. Certain insoluble additives tend to increase the massecuite viscosity, but also assist in the solidification of the massecuite granules when spray dried. An example of such a product is an instant orange drink which can be prepared by admixing the following components in the massecuite of examples above:

| | Kg. |
|---|---|
| Dextrose massecuite (dry solids) | 1000 |
| Concentrated orange juice | 80 |
| Sodium cyclohexysulfaminate | 10 |
| Soluble saccharine | 3 |
| Orange oil | 15 |
| Citric acid | 35 |

The granules or particles formed upon spray-crystallization assume a spherical shape in the air due to the surface tension of the liquid phase and their volume is progressively reduced as the liquid is concentrated. If the somewhat moist particles are allowed to age for a short while after deposition, the crystallization continues both on the surface of and between the existing micro-crystals, and each particles solidifies as its liquid portion is diminished. However, the liquid portion of each particle is prevented by its surface tension from migrating onto the surface of the particle but rather becomes concentrated toward the center of the particle. Hence although the spherical particles as obtained above may contain some impurities, they are free-flowing and substantially free from caking tendencies.

The optimum spraying conditions will vary somewhat with different types of equipment. A number of factors or variables such as: rate of air input, temperature and relative humidity of air, the amount and moisture content of the massecuite charge, the desired particle size, the distance or period of flotation in the air, etc., are interrelated so that a variation in one of them may require a variation in one or more of the others to obtain satisfactory operation. In spray-crystallizing the massecuite, it is essential not to effect the complete drying of the granules for the liquid phase of the massecuite can form a solid solution upon too rapid and complete evaporation. As a result the granules may tend to absorb moisture and cake during storage. It is important, therefore, to operate the process in such a manner that sufficient moisture is left in each granule to permit the gradual completion of the post-crystallization during ageing or curing.

After the completion of ageing or curing, the trace amount of water that still remains in the granule may be easily removed by means of a dryer which may be of conventional design.

Under a microscope the granules obtained by the above process appear as translucent, lustrous spheres. They are free-flowing and dissolve rapidly in water. This is, presumably, because each granule, which is an aggregate of microcrystals, disintegrates on contact with water and the dispersed microcrystals then rapidly dissolve.

Referring to FIG. 2, the principal stages in the formation of the granular crystalline product are illustrated on a greatly enlarged scale. It will be understood that the illustrated stages are part of a continuous process, and therefore to a certain extent the illustrations are artificial or hypothetical. For example, in stage A FIG. 2 shows an elongated droplet, as it might appear upon being discharged from the spray head. Since the massecuite is atomized to very fine droplet size (in the micron size range), some of the droplets as discharged will be more nearly spherical than others, but FIG. 2 is intended to illustrate the average shape sequence, where the droplets as originally discharged are on the average more irregularly shaped than after partial drying.

In stage B, the droplet is shown as having assumed a generally spherical shape due to the surface tension of the liquid. Upon further removal of liquid, a condition is reached as shown in stage C, where the aggregate has a generally spherical shape, with a somewhat cracked or irregular outer surface. In FIG. 2, the microcrystals are indicated by the letter M while the solution or liquid phase is indicated by the letter L. It will be understood that as the volume of the liquid phase L is reduced by the evaporation of water, that the aggregate will contract and that additional sugar crystals will form.

In stage D, which illustrates the condition of the aggregate after further crystallization, there is shown additional crystals M', being distributed between the original microcrystals M. At this stage, the granule still contains some additional solution L but is sufficiently firm to permit it to be transferred to ageing and drying equipment. Stage E shows the appearance of the aggregate after ageing and drying. Further crystallization has occurred, forming additional crystal particles M', and substantially all of the liquid phase L has disappeared. In other words, there is substantially no free water, the water having either evaporated or combined with the sugar, such as with the dextrose to form dextrose monohydrate.

The process of this invention can be practiced on a batch or continuous basis with various types of equipment. For example, a suitable plant layout is shown in FIG. 3. The concentrated water solution of the crystallizable sugar is passed through line 10, to crystallizers 11, 12, and 13 which discharge the crystalline massecuite produced therein to line 14. From what has been previously said, it will be understood that the massecuite is flowable and pumpable, and can therefore be delivered by pump 15 to a spray head 16 at the top of the spray dryer. A drying air stream is supplied to the spray dryer through a duct 17, which is connected to an air heater 18 and an air blower 19. The air containing the removed moisture is discharged through duct 20.

The microcrystal aggregates formed in the spray dryer are collected in a funnel section 21 and passed into the top of the curing chamber. This chamber provides a continuous curing bed, the granular material passing gradually downwardly and being discharged through a metered outlet 22 into a pipe conveyor 23 having an air intake 24 at its lower end. If desired the curing bed can be aerated or cooled to remove the heat of crystallization and to promote the curing. The upper end of conveyor pipe 23 communicates with the upper portion of a cyclone separator 24, which in turn connected to a suction duct 25 equipped with a suction blower 26. The aged granules flow out of the bottom of separator 24 through chute 27 into the feed end of a rotary dryer, and are discharged from the other end of the dryer into chute 28 which communicates with a chute 29 for introduction of the dried granules into a rotary cooler. The cooled granules passed to storage in a suitable hopper through connecting chutes 30 and 31, and may be removed from the outlet 32 for suitable packaging. It will be understood that the design or type of components of the plant assembly of FIG. 2 can be varied considerably without departing from the basic processing steps described previously.

As a modification of the apparatus of FIG. 3, means may be provided for passing air through the curing chamber to aerate the granules during their residence therein. Such aeration is particularly desirable, where the residual water must be removed from the granules rather than being converted to water of crystallization, as by the formation of dextrose monohydrate. Any remaining free water can be subsequently removed, by suitable equipment, such as in the illustrated rotary dryer.

The process of this invention is applicable to starch hydrolyzates from any of the common starch sources, and is particularly suitable for use with corn or potato starch hydrolyzates. By known acid-enzyme or enzyme-enzyme conversion procedures, the starch is converted to a high D.E. syrup. For example, the converted starch may have a dextrose equivalent within the range from 90 to 99. A typical specific D.E. is about 96–97. The clarified concentrated syrup, which is a water solution of the dextrose with a small proportion of oligosaccharides, is then subjected to partial crystallization. The syrup to be crystallized can advantageously contain about 70% total sugar solids in solution. However, the relative water and solids content may vary. It has been found advantageous to maintain the water content in relation to the solid at above 30% and below 36% water by weight. Such syrups are well suited for the partial crystallization operation to form microcrystalline massecuites. While the crystallizing conditions can vary, the feed to the crystallizer is preferably introduced at a temperature below about 30° C., and can be maintained at a temperature in the crystallizer of about 20–25° C. Using continuous crystallizers, a crystallization time of as short as 8 to 10 hours can be sufficient, while with batch crystallization equipment, a crystallization time of up to 18 hours may be desirable. The character of the massecuite can be progressively checked by microscopic examination and by solids determination. While the specific solids content of the massecuite can vary, a typical end point for the initial crystallization is reached where the massecuite contains about 50% solids (the solids comprising the microcrystals such as microcrystalline dextrose monohydrate).

In the spray crystallization operation, the massecuite may be advantageously introduced at a temperature of about 40° to 43° C. Where the massecuite being sprayed contains dextrose which it is desired to convert to dextrose monohydrate, the temperature of the feed and of the solid material within the spray dryer should be maintained below about 50° C. However, the drying air can be introduced at a higher temperature, such as a temperature of 80 to 85° C., and the air discharged at a temperature below 50° C. For these conditions, the product from the spray dryer can be formed and discharged at a temperature of about 40 to 43° C.

In the spray dryer, only a portion of the water is removed, leaving a residual solution of the crystallizable sugar, such as a solution of dextrose. For the formation of a Total Sugar product, the water content of the granular aggregates as discharged from the dryer can advantageously range from about 11.5 to 13.5% by weight.

During the ageing or curing steps, which can advantageously take from about 3 to 8 hours, additional dextrose is crystallized, the crystals preferably being formed as dextrose monohydrate. It is therefore desirable to keep the temperature of the material below 50° C., a room temperature range being suitable, such as temperatures from 20 to 25° C. Following the additional crystallization, the product may be further dried, and here again it is desirable to keep the temperature of the product below 50° C. where the product is to contain dextrose monohydrate. For other sugars, higher temperatures can be used. For producing a Total Sugar product, a drying temperature of about 30 to 35° C. (product temperature) is desirable. The Total Sugar product can have a final moisture content of about 9 to 10% by weight. Where the final moisture content is substantially less than 9%, some of the dextrose monohydrate may be converted to anhydrous dextrose. However, it may be desired to produce a mixed product containing anhydrous dextrose and dextrose monohydrate. For such a product, the final moisture content can range down to as low as 4 to 6%, but it is usually desirable to maintain a major portion of the dextrose in the form of dextrose monohydrate. It will be understood that in the dryer, a drying air temperature of about 50° may be used, such as a temperature of 60–70° C. without resulting in too high a product temperature.

Since the granular aggregates produced by the method of this invention each contain a multiplicity of microcrystals, it will be understood that the initial crystallization should be conducted so as to limit the growth of large size crystals. However, an equilibrium condition for the production of a microcrystalline massecuite can easily be obtained. For example, microcrystalline aggregates having microcrystals of an average size of about 20 to 80 microns can be used to prepare a granular product having aggregate particle sizes averaging about 100 to 200 microns. It will be understood that these dimensions are illustrative and not necessarily limiting. Over-size or under-size granular aggregates can be screened and removed from the final product, the aggregates being redissolved in the feed to the crystallizers or otherwise reprocessed.

In preparing a Total Sugar product, the time required for the additional crystallization in the ageing step is related to the D.E. of the initial syrup where optimum results are desired. For example, where the starch hydrolyzate has a D.E. of about 96–97, the additional crystallization and ageing step can be accomplished in as little as 3 hours. As the D.E. is lowered, optimum additional crystallization may require several additional hours. For example, where the D.E. is from about 92 to 94, the time required for optimum additional crystallization may range from 5 to 8 hours.

As previously indicated, the granular aggregates produced in accordance with the present invention are rapidly and completely soluble in water. This is apparently due to the relatively large surface area of the microcrystals in the aggregates and of the somewhat porous or fissured nature of the aggregates. Products produced by the spray-crystallization process of this invention have compared in solubility characteristics with crystalline sugar products produced in other ways and found to be significantly more soluble.

We claim:
1. Process of preparing a granular crystalline product from a water solution of a starch hydrolyzate composed of dextrose and oligosaccharides and having a D.E. of at least 94, characterized by the steps of:
   (a) subjecting said solution to partial crystallization to form a massecuite composed essentially of microcrystals of dextrose monohydrate dispersed in a substantially saturated water solution of dextrose containing said oligosaccharides, said massecuite being pumpable and sprayable;
   (b) spraying said massecuite into a drying air stream to form atomized droplets and to remove part of the water from said droplets in said air stream to form granular aggregates of said dextrose monohydrate microcrystals in association with residual portions of said dextrose solution containing said oligosaccharides, the temperature of said air stream being controlled to limit the maximum temperature of said massecuite droplets to a temperature below 50° C.;
   (c) ageing and drying the said granular aggregates to crystallize additional dextrose monohydrate from said residual portions and to further reduce the free water content thereof.

2. The process of claim 1 wherein said starch hydrolyzate has a D.E. of about 96 to 97.

3. The process of claim 1 wherein said step (b) is carried out in a spray dryer, and said aggregates as formed in said spray prior to said step (c) contain total water of approximately 13% by weight.

4. The granular crystalline product produced by the process of claim 1.

5. Process of preparing a granular crystalline product from a water solution of a starch hydrolyzate composed of dextrose and oligosaccharides and having a D.E. of at least 94, characterized by the steps of:
   (a) subjecting said solution to partial crystallization to form a massecuite composed essentially of microcrystals of dextrose monohydrate dispersed in a substantially saturated water solution of dextrose containing said oligosaccharides, said massecuite being pumpable and sprayable;
   (b) pumping said massecuite to a spray dryer and spraying said massecuite therein into a drying air stream to form atomized droplets and to remove part of the water from said droplets in said air stream to form granular aggregates of said dextrose monohydrate microcrystals in association with residual portions of said dextrose solution containing said oligosaccharides, said massecuite droplets and said granular aggregates being maintained at a temperature below 50° C.;

(c) ageing and drying the said granular aggregates to crystallize additional dextrose monohydrate from said residual portions and to further reduce the free water content thereof.

6. Process of preparing a granular crystalline product from a water solution of a total sugar starch hydrolyzate composed of dextrose and oligosaccharides and having a D.E. of above 94, characterized by the steps of:

(a) subjecting said solution of total sugar to partial crystallization to form a pumpable massecuite composed essentially of microcrystals of dextrose monohydrate dispersed in a substantially saturated water solution of dextrose containing said oligosaccharides;

(b) spraying said massecuite into a drying air stream to form atomized droplets and to remove part of the water from said droplets in said air stream to form granular aggregates of said dextrose monohydrate microcrystals in association with residual portions of said total sugar solution containing said oligosaccharides therein;

(c) depositing said granular aggregates from said air stream with a total water content by weight of over 10% up to about 13%;

(d) thereafter ageing and drying the said granular aggregates to crystallize additional dextrose from said residual portions and to further reduce the free water content thereof;

whereby a free-flowing non-hygroscopic granular total sugar product is obtained.

7. The process of claim 6 wherein said starch hydrolyzate has a D.E. of about 96 to 97.

8. The process of claim 6 wherein the said granular aggregates as deposited from said air stream contain total water of substantially 13% by weight.

9. The process of claim 6 wherein said total sugar product is dried following said step (d) to a total water content of substantially less than 9% by weight to convert at least part of said dextrose monohydrate to anhydrous dextrose.

10. The granular total sugar product produced by the process of claim 9.

References Cited

UNITED STATES PATENTS

| | | | |
|---|---|---|---|
| 1,512,730 | 10/1924 | Washington | 127—30 |
| 2,728,678 | 12/1955 | Sharp | 99—199 |
| 3,236,687 | 2/1966 | Smith et al. | 127—38 |
| 2,317,479 | 4/1943 | Peebles. | |
| 2,333,333 | 11/1943 | Peebles. | |

MORRIS O. WOLK, Primary Examiner

S. MARANTZ, Assistant Examiner

U.S. Cl. X.R.

99—199; 127—58, 61